(12) United States Patent
Rivera

(10) Patent No.: US 9,781,901 B2
(45) Date of Patent: Oct. 10, 2017

(54) PET CARRIER WITH SHOCK ABSORBING PANEL

(71) Applicant: Jonathan L Rivera, Dallas, TX (US)

(72) Inventor: Jonathan L Rivera, Dallas, TX (US)

(*) Notice: Subject to any disclaimer, the term of this patent is extended or adjusted under 35 U.S.C. 154(b) by 109 days.

(21) Appl. No.: 14/972,220

(22) Filed: Dec. 17, 2015

(65) Prior Publication Data
US 2017/0172102 A1    Jun. 22, 2017

(51) Int. Cl.
*A01K 1/02*    (2006.01)
*A01K 29/00*   (2006.01)
*A45F 3/04*    (2006.01)

(52) U.S. Cl.
CPC ............. *A01K 1/029* (2013.01); *A01K 29/00* (2013.01); *A45F 3/04* (2013.01)

(58) Field of Classification Search
CPC ..................................................... A01K 1/029
USPC ......................................................... 119/497
See application file for complete search history.

(56) References Cited

U.S. PATENT DOCUMENTS

| | | | | |
|---|---|---|---|---|
| 5,176,102 | A * | 1/1993 | Tracy | A01K 1/0254 119/497 |
| 2002/0074372 | A1* | 6/2002 | Pickett | A01K 1/0254 224/637 |
| 2008/0149673 | A1* | 6/2008 | Slater | A01K 1/0254 224/153 |
| 2009/0255770 | A1* | 10/2009 | Slater | A45C 9/00 190/1 |
| 2013/0327803 | A1* | 12/2013 | Chiang | A45F 3/04 224/582 |

FOREIGN PATENT DOCUMENTS

| | | | |
|---|---|---|---|
| KR | 2020030021586 | * | 9/2003 |
| KR | 2020050019350 | * | 10/2005 |

* cited by examiner

*Primary Examiner* — Daniel J Colilla
(74) *Attorney, Agent, or Firm* — Jeffrey Roddy

(57) ABSTRACT

A pet carrier for facilitating interactive experiences between a pet and pet owner includes including a pocket with an opening, two sides and a bottom adapted to partially surround a pet. The pocket has a resilient panel lining the bottom or sewn into the bottom that tensions the sides when the carrier is worn and a pet is placed in the pocket, and which provides a firm footing for the pet when transported by the pet owner.

8 Claims, 15 Drawing Sheets

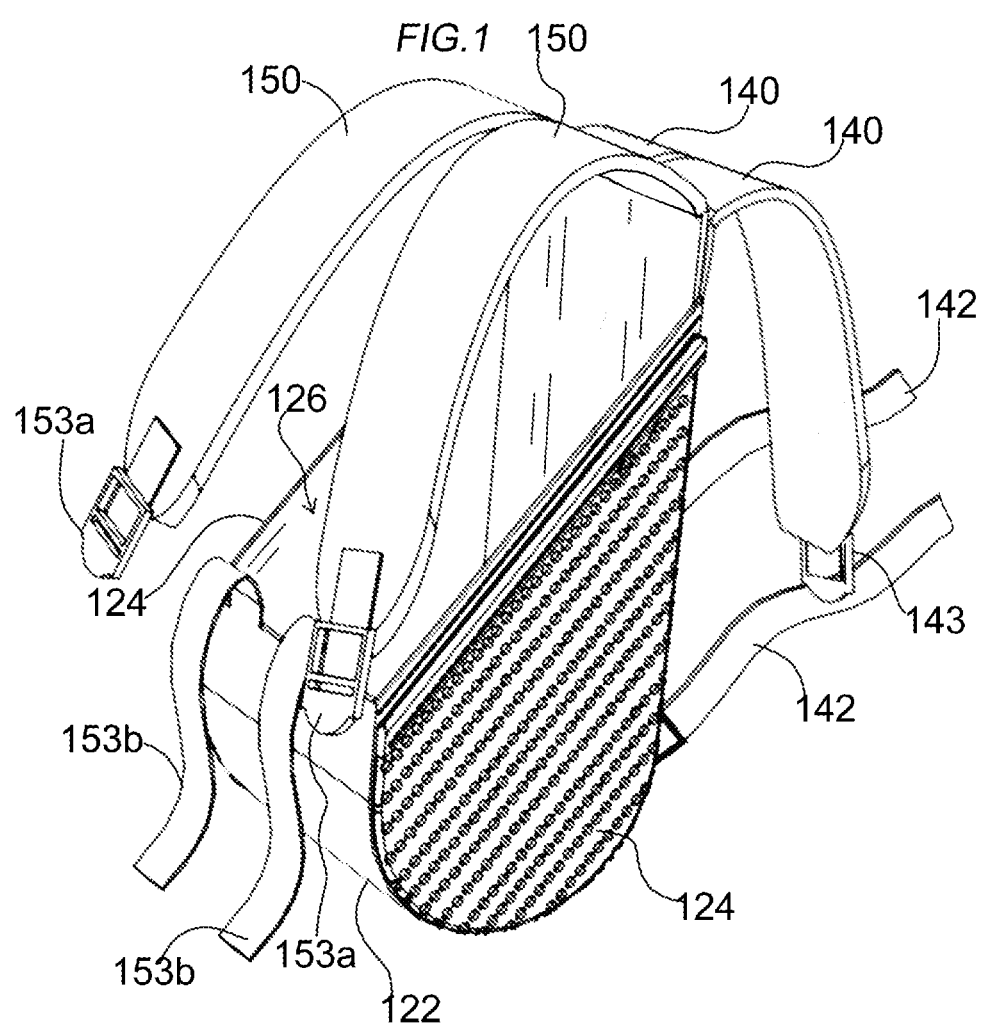

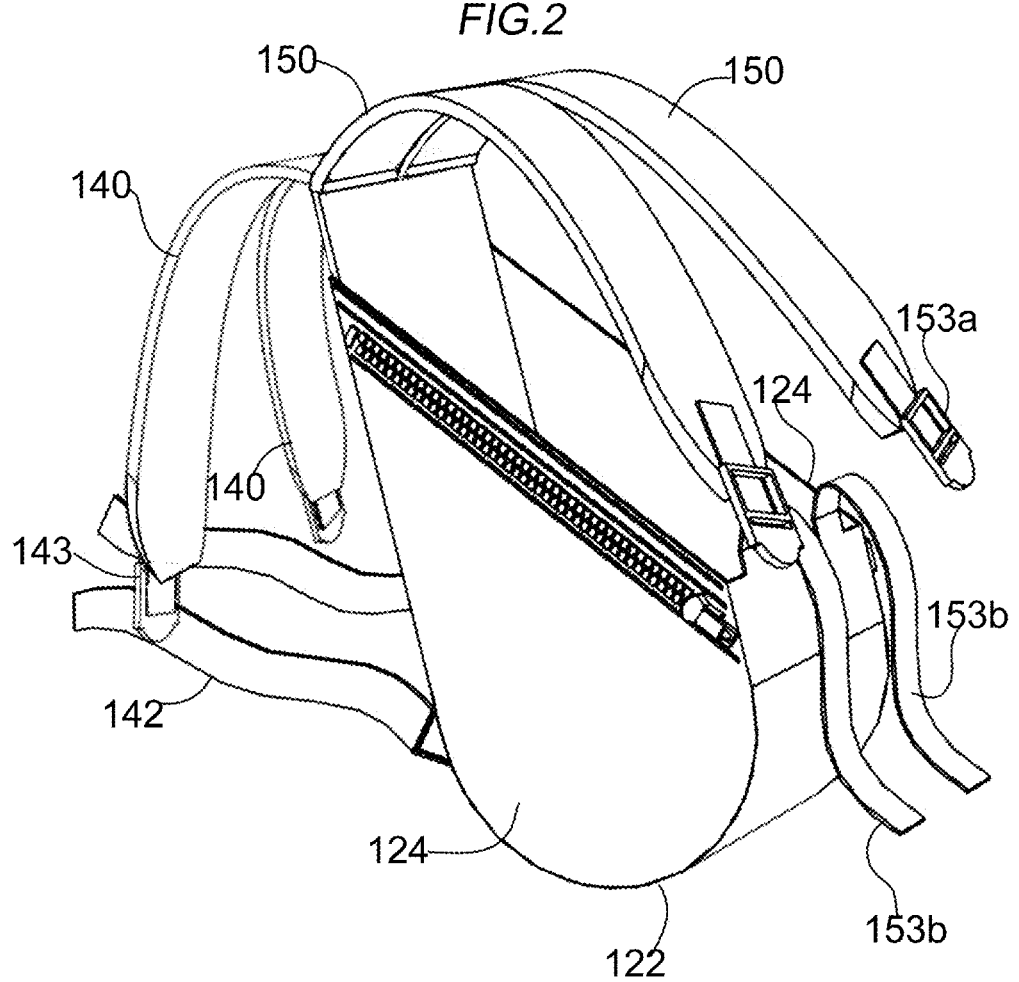

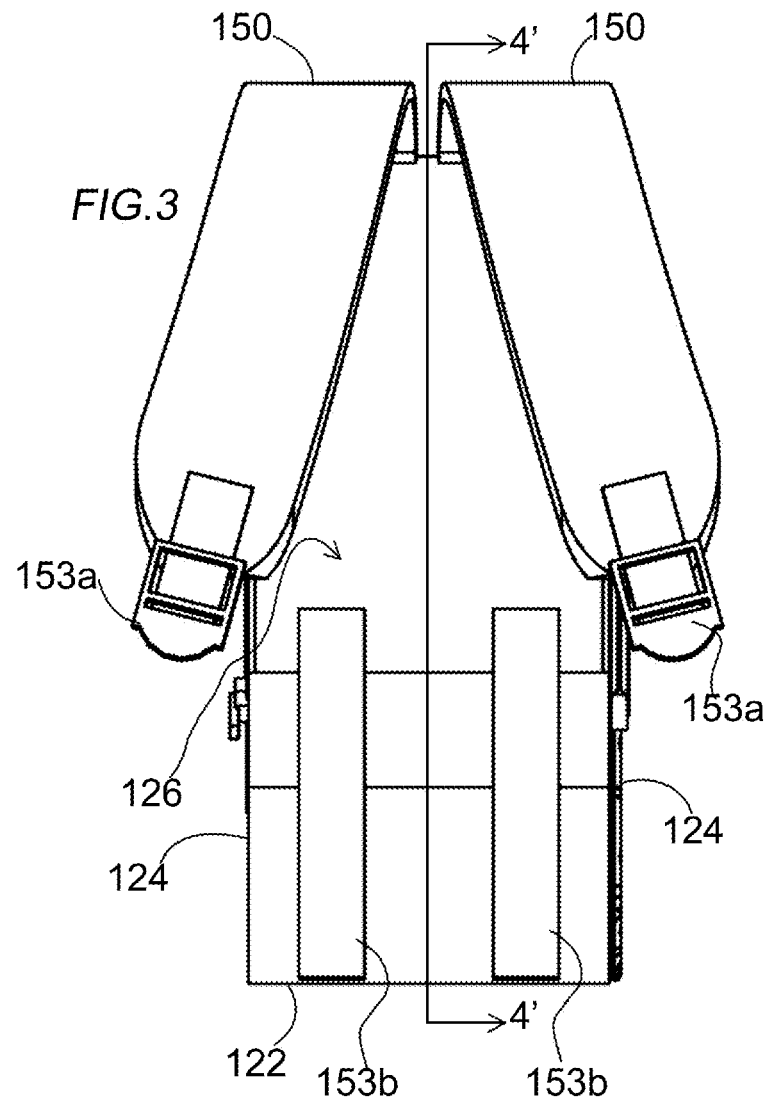

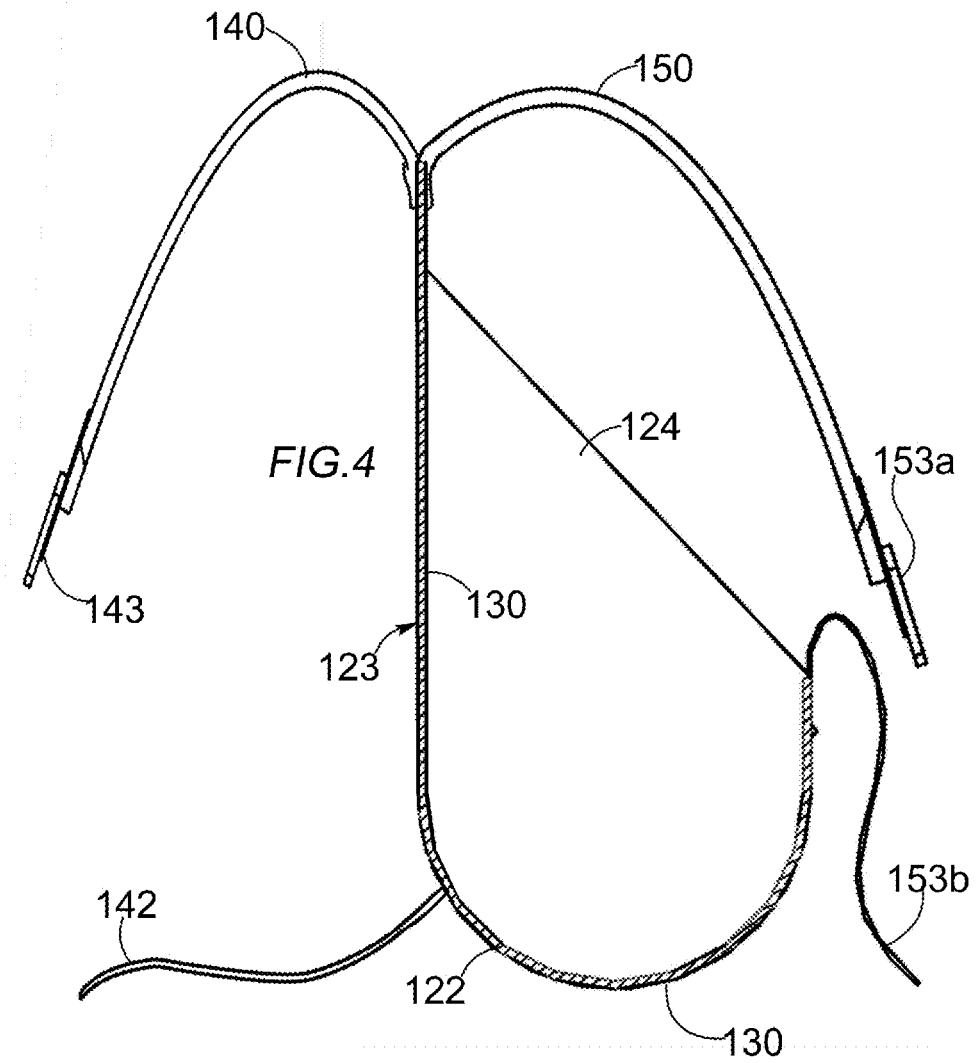

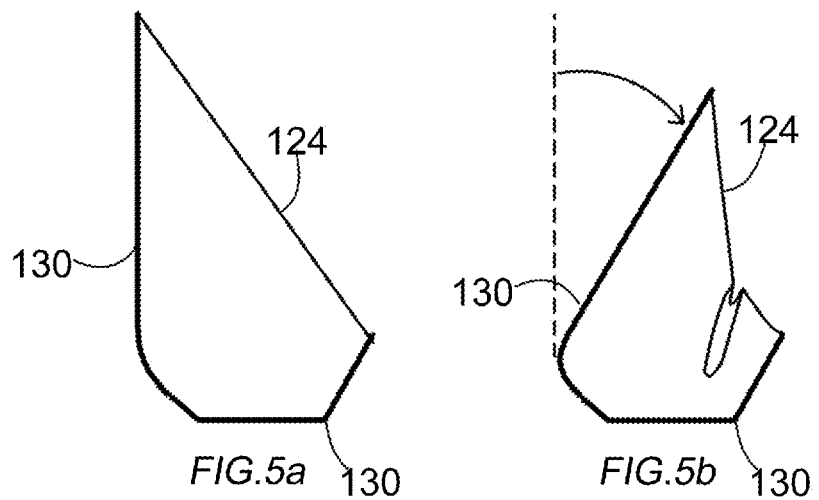
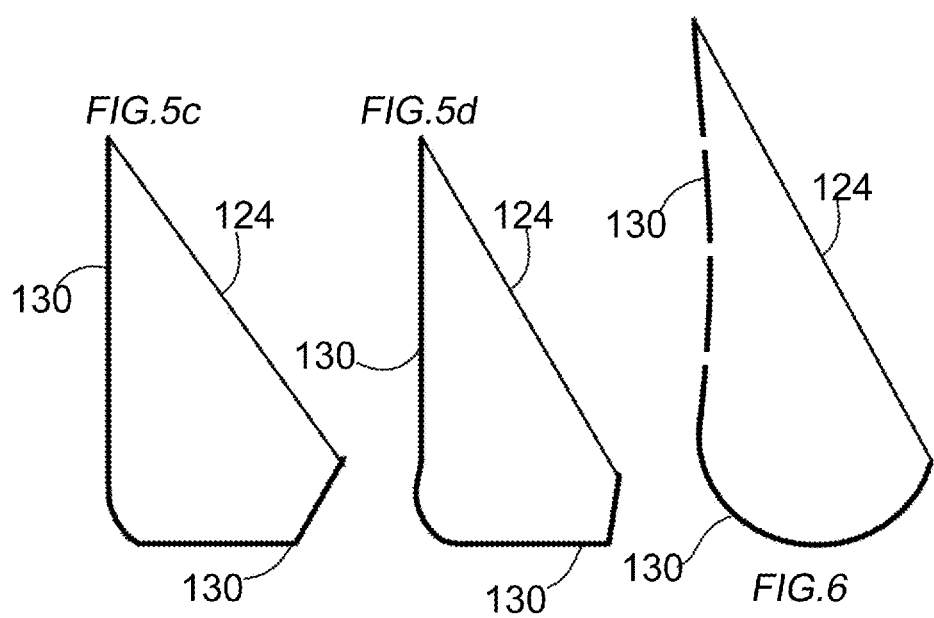

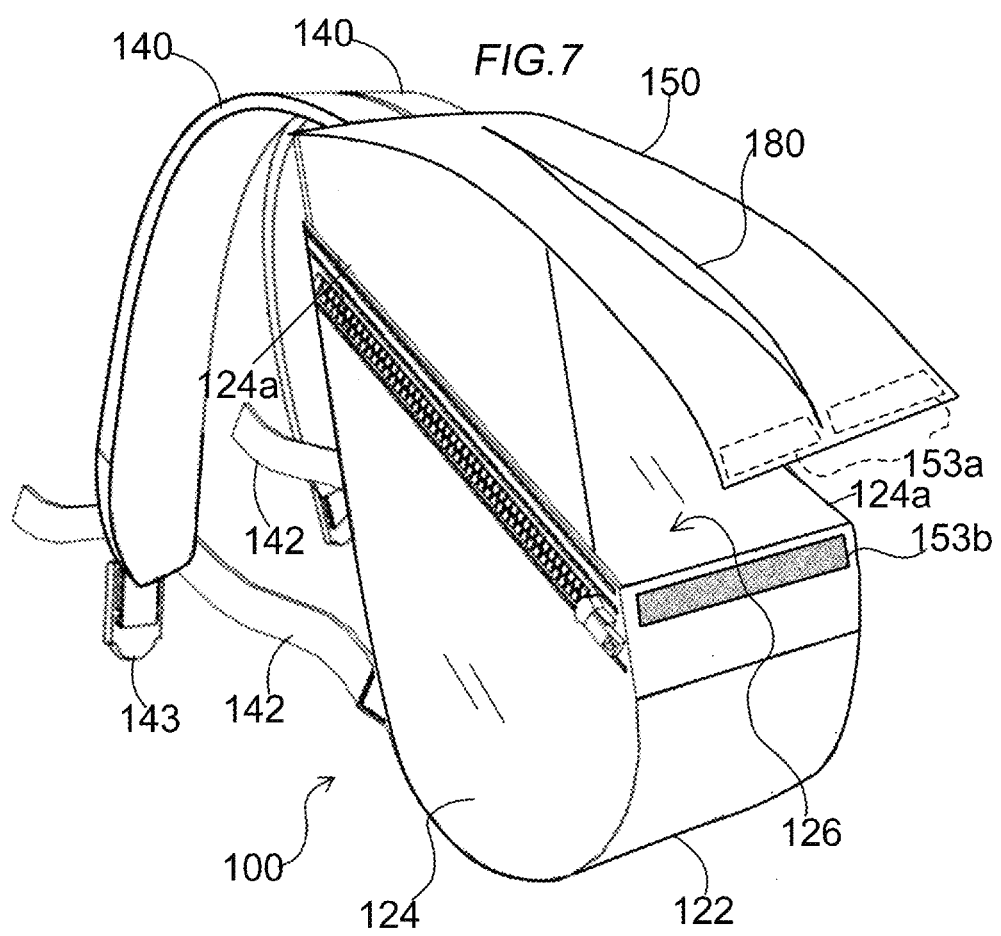

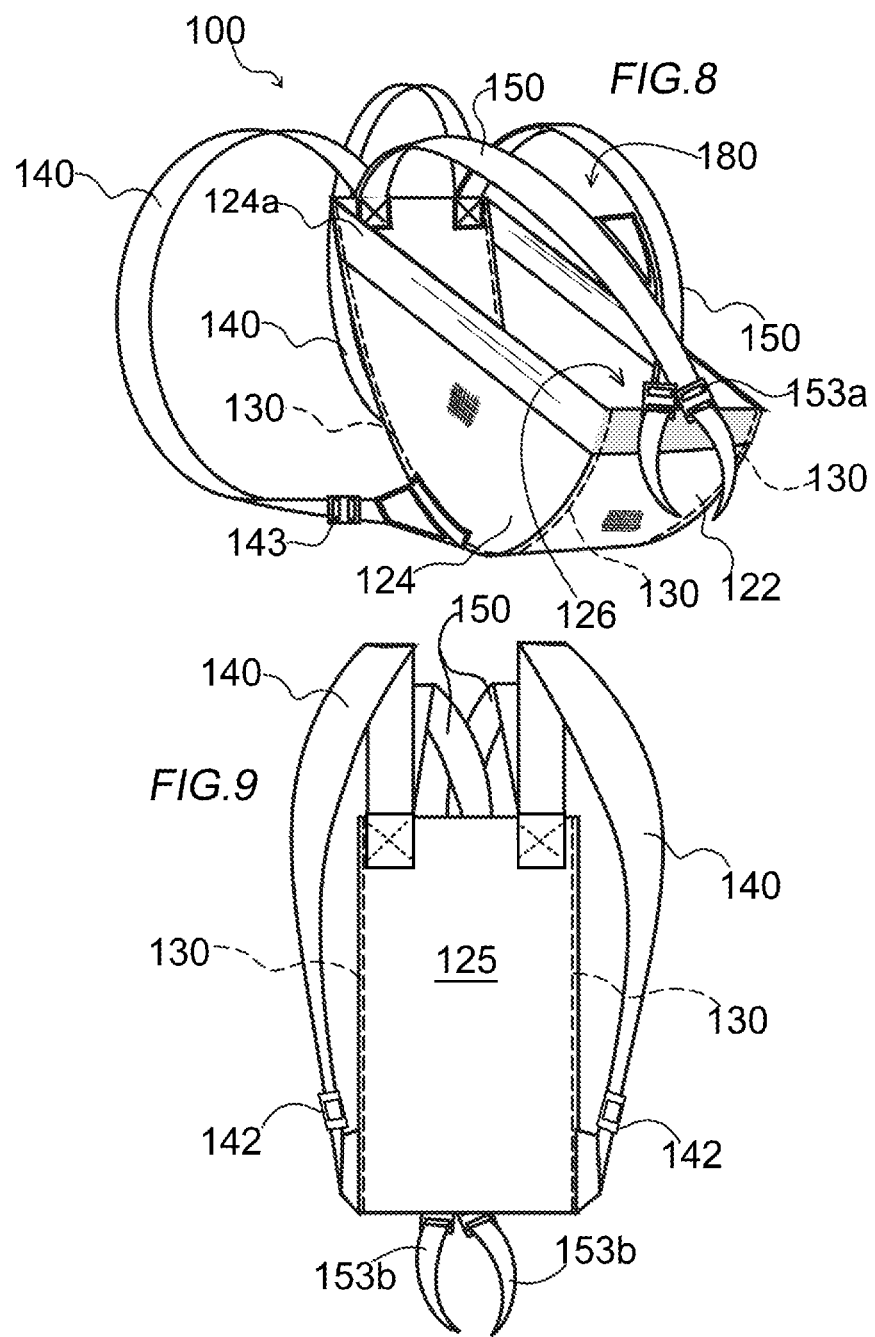

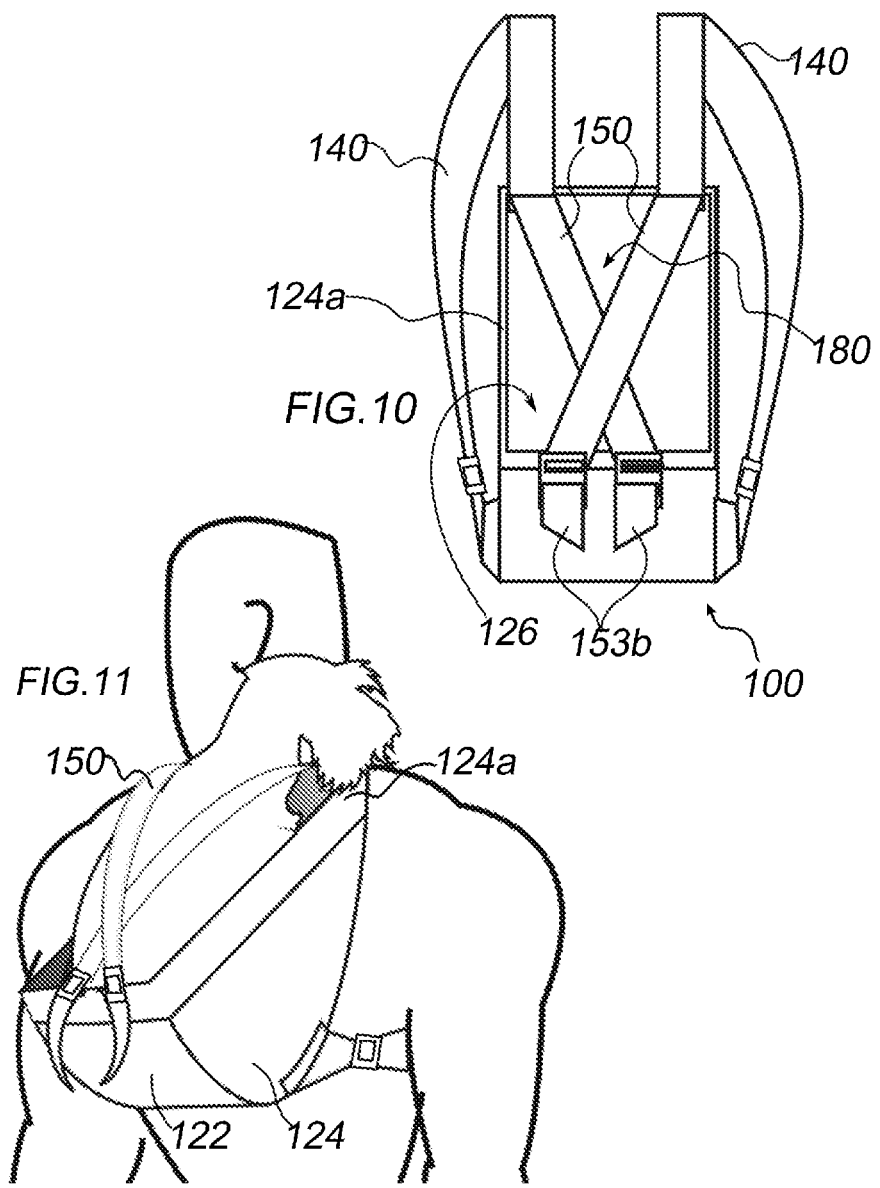

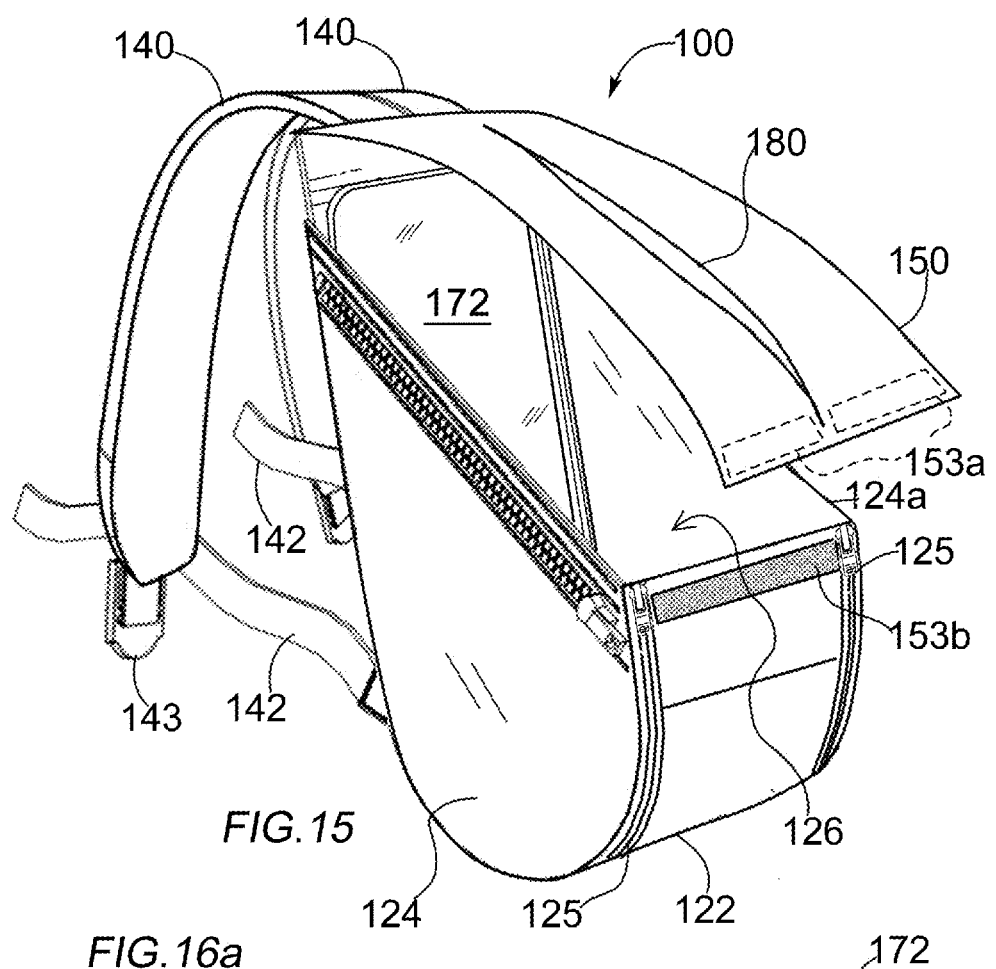
FIG. 15
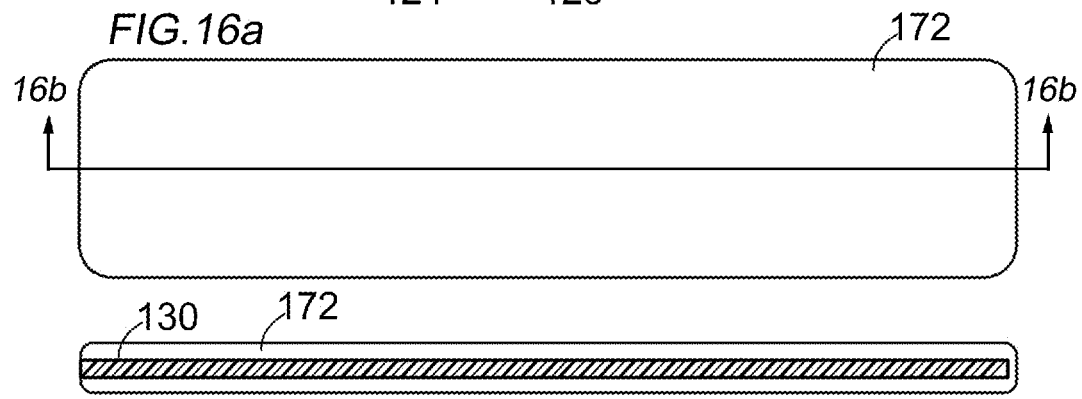
FIG. 16a
FIG. 16b

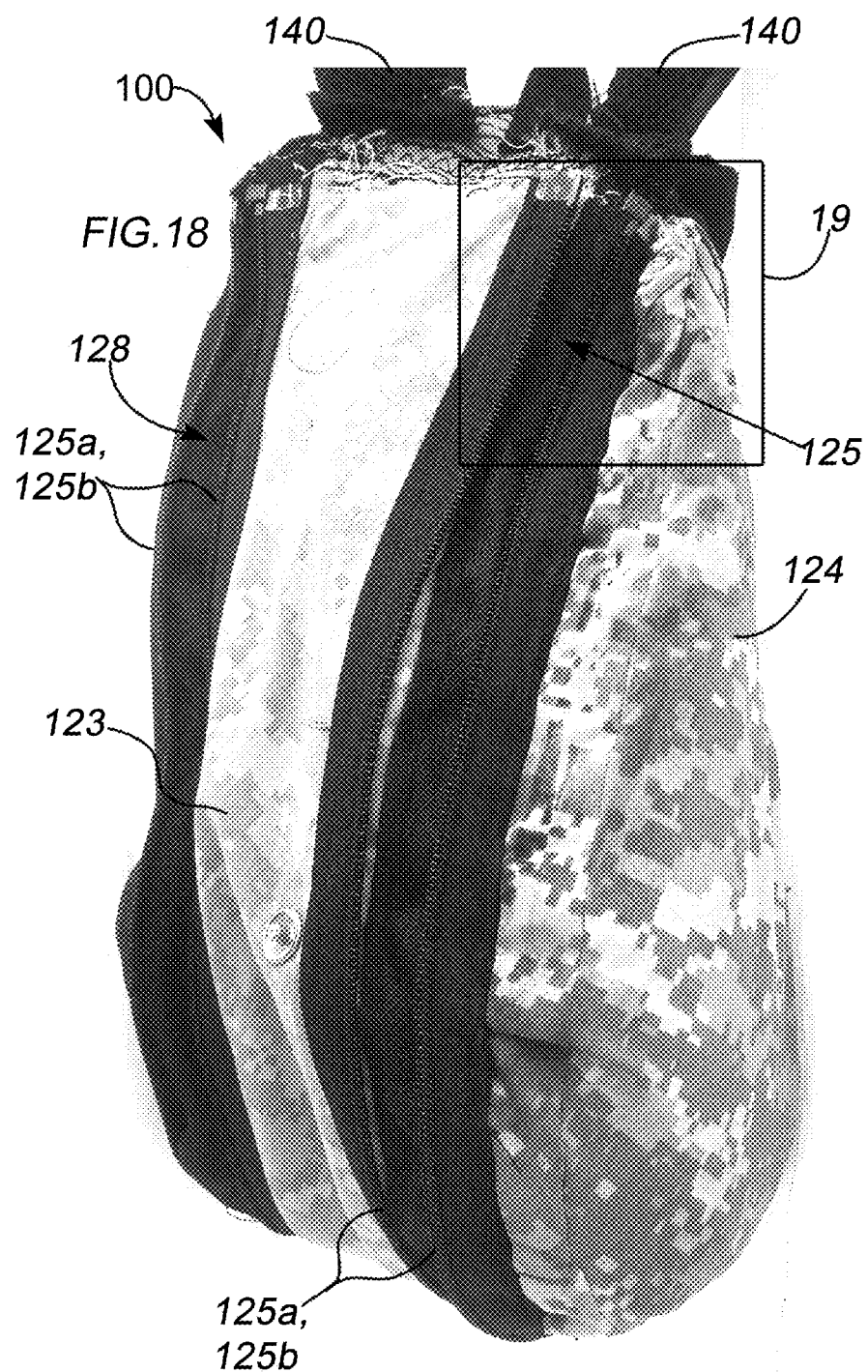

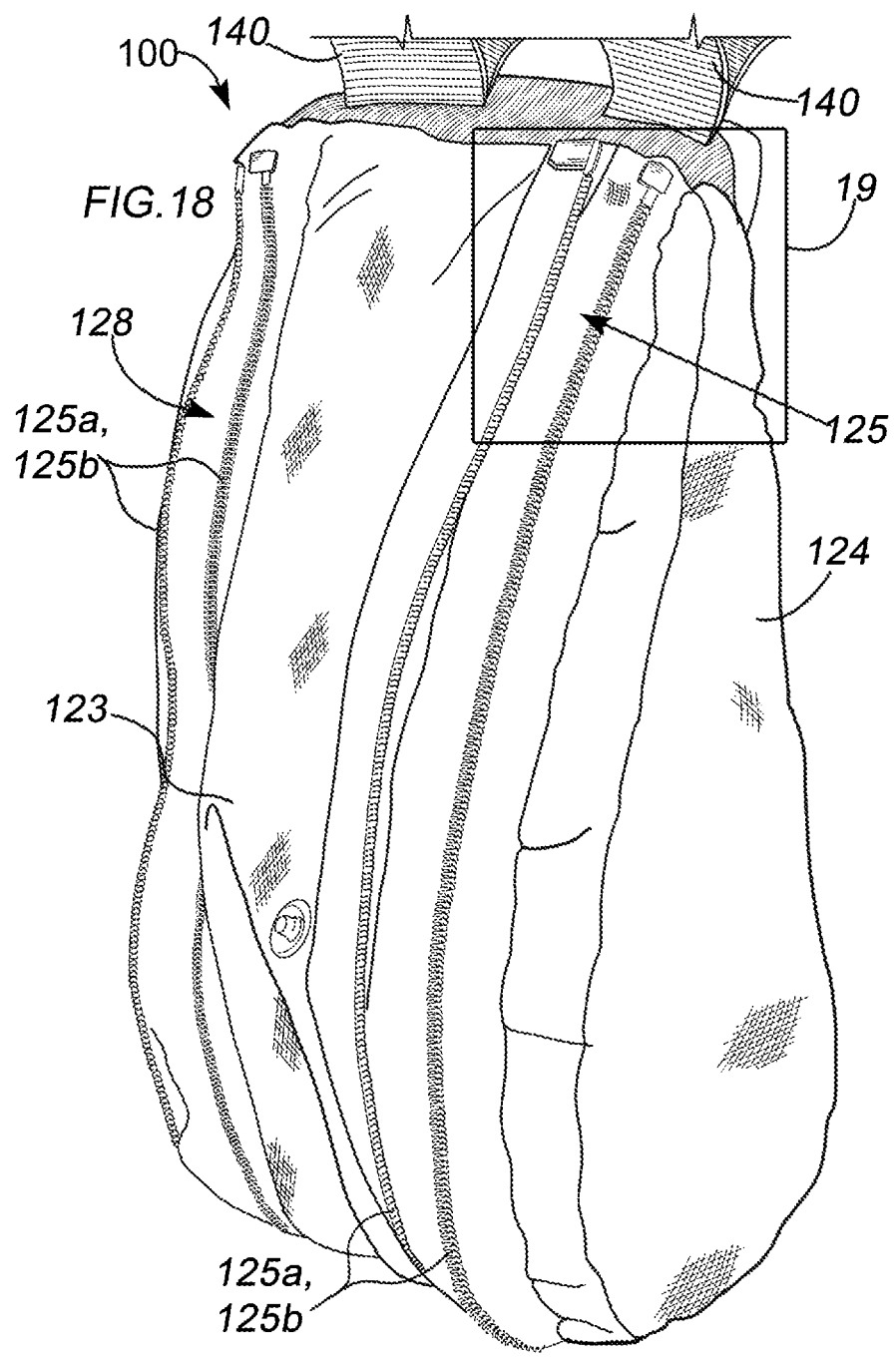

PET CARRIER WITH SHOCK ABSORBING PANEL

CROSS REFERENCE TO RELATED APPLICATIONS

This application is a Continuation-in-Part of PCT Application No. PCT/US14/57022 titled: "Pet Carrier," having a International Filing Date of Sep. 23, 2014, and which claims the benefit of U.S. Provisional Patent Application No. 61/880,998 filed Sep. 23, 2013.

FIELD OF THE INVENTION

The present invention relates generally to pet carriers, and more specifically to a pet carrier to be supported by a pet owner's shoulders.

BACKGROUND OF THE INVENTION

Backpack style pet carriers have been described in the past. U.S. Pat. No. 6,481,606 to Pickett describes a pouch with a drawstring opening and shoulder straps. U.S. Pat. No. 5,419,281 to Williams et al. describes a backpack-style animal carrier being of fabric and rigid frame construction.

While such devices are capable of transporting a pet, a number of issues remain. When carried in a pouch a pet will assume an awkward, unnatural and possibly unhealthy position, or simply slump in accordance with the shape of the carrier and go to sleep. Dog owners appreciate that their pets enjoy actively participating in travel whether by being walked or riding in a vehicle. One iconic image that comes to mind is a dog sticking its head out of a vehicle window to feel the sun and wind on its face. Accordingly, it is felt that past pet carriers do not adequately address the needs and sensitivities of the pet when accompanying their owner in various activities.

It would be desirable to provide a pet carrier that encourages a pet to maintain a forward facing aspect so that it is able to see what its owner sees.

It would be further desirable to provide a pet carrier that encourages a pet to sit or stand in an upright sure-footed position while being transported.

It would be still further desirable to provide a pet carrier having a structure with shock absorbing properties.

It would be particularly desirable to provide an easy means for maintaining the pet carrier in a clean state.

It would be especially desirable to provide a lightweight pet carrier that can accommodate a range of pet sizes and that is collapsible into a generally flat, low profile package.

SUMMARY OF THE INVENTION

A general embodiment of the present invention includes a pet carrier with a pocket and pocket opening configured to receive and house a pet, two sides and a bottom. The pocket has a resilient panel lining the pocket bottom or sewn into the pocket bottom that tensions the sides when the carrier.

In various embodiments, the resilient panel may be removable for cleaning; e.g., the resilient panel may replaceably slide into a sleeve sewn to or removably attached to the bottom of the pet carrier.

In various embodiments, the resilient panel may be embedded inside a padded or un-padded sleeve that may be removable from the pet carrier.

In various embodiments, a sleeve surrounding the resilient panel may be removable and launderable.

In various embodiments, the pet carrier sides may have reversibly configurable sides that adapt the pet carrier pocket to house a range of pet sizes.

In various embodiments, the pet carrier sides may possess a zip fastener, that when un-zipped permits the sides to expand in order to accommodate a range of pet sizes.

In various embodiments, the pet carrier may employ a pad or wedge adapted to fit between a human transporter and the bottom of the pet carrier to dispose the pet carrier in a forward tilting positions.

In various embodiments, the pet carrier my employ a pad or wedge adapted to fit between a human transporter and the bottom of the pet carrier for comfort.

In various embodiments, the resilient panel may be a sheet of flexible plastic such as polyethylene or polypropylene of $3/32$ inch or less in thickness that may be curled or flattened for storage with the carrier. Other panel materials and thicknesses will suggest themselves to those having skill in the art and benefit of this disclosure. Whatever the panel material, the panel has memory and a bias for a flat state. When worn, the panel is constrained by portions the pocket fabric but because of bias, strains toward a flat disposition which causes the pocket sides to tauten somewhat like a drumhead. The carrier may be rolled up and an elastic cord placed around the transverse axis of the pocket for storage. The panel provides a substantially firm and level surface on which the pet stands or sits upright rather than slumping down and conforming to a soft flexible bottom.

The following is a non-exhaustive list of features and advantages of the present invention:

1. The resilient panel being constrained by the length of the pocket and sides of the pet carrier, produces a curvature at the bottom of the pet carrier that functions as a spring where gravity acts to keep pressure on the pet against the panel which permits interactive pivoting of the pet's stance from side to side in response to transporter motion.

2. Due to the non-slumping platform, the pet now has a stable platform that permits the pet to position itself for balance.

3. The bottom shape of the pet carrier produced by the constrained resilient panel which is biased to a seek a planar disposition, constrained in its expansion by the body of the pet carrier, but relatively unconstrained when curling, acts like a spring where the weight of the pet maintains the pet carrier bottom firm against the transporter's back and provides more control for the pet to adjust its body when being transported, and importantly, avoids shocks and jolts to the pet.

4. The plastic backing curvature creates a spring like shape were the weight of the pet keeps pressure directed toward the transporter and acts to decrease the distance between the transporter and the pet's centers of gravity. This increases the shared inertia between rider and pet.

5. The firm platform for the pet promotes alertness and participation.

While in the particular embodiments depicted herein, the pocket is generally teardrop in shape with the resilient panel running the length of the entire pocket in order to shield the owner's back, it should be understood that other shape variations will suggest themselves to those having skill in the art and benefit of this disclosure. Accordingly, structures such as inside or outside pockets; e.g., a pouch for holding a water bottle, or a zippered pocket for keys or a cellphone can be introduced to or incorporated with the sides without departing from the scope of the present invention.

In a first aspect in accordance with the present invention, a pet carrier includes a resilient panel which maintains along its transverse axis, a level; i.e., firm and non-slumping, floor on which a carried pet is able to comfortably stand or sit in an upright position.

In a second aspect combinable with any other aspect, a pet carrier includes a sewn in flexible panel which has a planar bias and is constrained by surrounding fabric to assume a curved shape along a longitudinal axis of a pocket which is sized and shaped to surround a transported pet.

In a third aspect combinable with any other aspect, a pet carrier assumes a ready-to-use shape; e.g., by "springing" into a usable shape, due to a planar bias of a constrained resilient panel housed by the pocket of the pet carrier.

In a fourth aspect combinable with any other aspect, a pet carrier possesses an expandable pocket adapted to house a pet and accommodate a range of pet sizes.

In yet another aspect combinable with any other aspect, a pet carrier includes a removable liner for laundering purposes.

Other objects, features, and advantages of the invention will become more apparent from the following detailed description, which proceeds with reference to the accompanying figures wherein the scale depicted is approximate. Exemplary implementations, embodiments and examples that follow are non-exhaustive.

BRIEF DESCRIPTION OF THE DRAWINGS

FIG. 1 is a rear facing perspective view of a first side of one embodiment of a pet carrier according to the present invention;

FIG. 2 is a rear facing perspective view of a second side of one embodiment of a pet carrier according to the present invention;

FIG. 3 is a back elevation of an embodiment of a pet carrier according to the present invention;

FIG. 4 is a cross-sectional view taken along lines 4-4 of (FIG. 3);

FIGS. 5*a* and 5*b* are diagrammatic views of one embodiment of a pet carrier according to the present invention;

FIGS. 5*c* and 5*d* illustrate various panel configurations for embodiments described herein;

FIG. 6 illustrates a panel configuration of one embodiment of a pet carrier with an upper portion divided into multiple panels;

FIG. 7 is a perspective view of one embodiment of a pet carrier having a flap for bridging the opening of a pet carrier;

FIG. 8 is a perspective view of an embodiment of a pet carrier according to the present invention;

FIG. 9 is a front elevation of the embodiment shown in (FIG. 8);

FIG. 10 is a back elevation of one embodiment having opening 126 bridged by pet retention members 150;

FIG. 11 is a perspective view of the embodiment shown in (FIG. 10) in a typical use setting;

FIG. 15 is a perspective view of the pet carrier showing side expansion join 125 closed by a zip fastener;

FIG. 16*a* is top plan view of a replaceable pad;

FIG. 16*b* is a cross-section taken along lines 16*b*-16*b* of (FIG. 16*a*);

FIG. 18 is a perspective view of the carrier showing the borders between the left and right sides 124 and front 123, with a zip fastener defining a side expansion join 125 along the borders.

DETAILED DESCRIPTION OF THE INVENTION

Reference Listing

Figure 12:
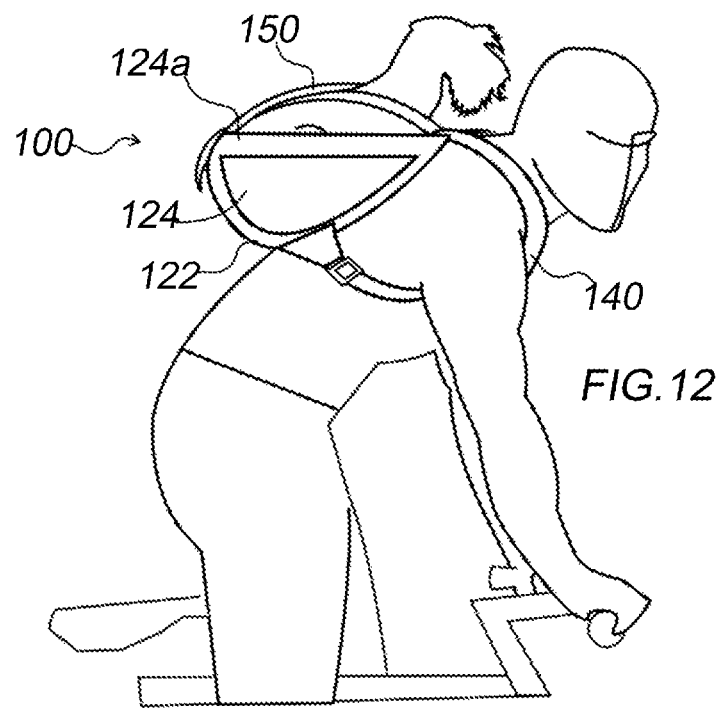
FIG. 12 is a side elevation of the embodiment shown in (FIG. 10) in a typical use setting.

100 carrier
120 pocket
122 bottom
123 pet carrier front
124 sides
124*a* side band
125 side expansion join
125*a*, 125*b* zip fastener sides
126 opening
130 panel
130*a* removable panel
140 shoulder strap
142 lower strap
143 strap buckle
150 pet retention member
153*a*, 153*b* retention member fasteners
170 wedge
172 pad
180 pet aperture Definitions In the following description, the term "carrier" refers to carriers worn on the back which are adapted to transport a pet such as a small or medium sized dog or cat. The term "longitudinal axis" when used herein, means the axis defined by line 4'-4' of (FIG. 3). The singular terms "a", "an", and "the" include plural referents unless the context clearly indicates otherwise. Similarly, the word "or" is intended to include "and" unless the context clearly indicates otherwise. Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety for all purposes. In case of conflict, the present specification, including explanations of terms, will control. In addition, the materials, methods, and examples are illustrative only and not intended to be limiting.

Referring generally to FIGS. 1 through 18, a generally teardrop shaped pet carrier 100 includes sewn construction with sides 124, a front side 123, a back facing side with a top opening 126, a pocket 120 and bottom 122. Adhered to, fastened to or sewn to the bottom is a resilient panel 130, the bounds of which relative to front and back sides of the pet carrier, are indicated in FIGS. 8 and 9 by a dashed line. The pet carrier has sides 124 that stretch and become taut when the resilient panel 130 is in a relaxed position; i.e., not folded or rolled for storage purposes because the resilient panel 130 has a planar bias and is constrained from assuming a planar shape by the bounds of the carrier pocket 120 bounded by the sides 124, top opening 126 and bottom 122. The resilient panel 130 may possess a fabric cover which is attachable to the inside bottom of the pocket by hook and loop fasteners or other non-permanent fastener. The resilient panel may slide into a sleeve formed in the carrier bottom. The resilient panel may be entirely removable, and itself possess a removable launderable cover which may be padded. Side bands 124a at the upper edges of sides 124 are preferably made of an elasticized fabric that constrain resilient panel 130 to a generally J-shaped or C-shaped profile when the resilient panel is attached to the bottom 122, while still permitting the pocket to flex with the resilient panel when the pet is transported. An elastic cord, not shown, can be sewn into bands 124a corresponding to the top left and bottom left corners and the top right and bottom right corners of the panel to maintain a curved shape while permitting flexing.

The resilient panel 130 may be one piece or multiple adjoining sections. The panel may be bent or scored transversely. In any case, the lower portion of the panel provides a stable transversely level, and non-slumping floor on which a pet may stand or sit.

Referring to FIGS. 1-4, and FIGS. 7-14 a resilient panel 130 is depicted in a relaxed state wherein the panel has assumed a J-shape due to the constraining material of the carrier. Because panel 130 is flexible, the carrier can be stored by placing straps 140 into opening 126 and further bending or rolling along the bend shown at the bottom of the figure. In cases where the resilient panel is removable, the otherwise soft construction of the pet carrier permits collapse and easy storage, e.g., placement in a draw string bag.

As seen in FIG. 2, while pet carrier bottom 122 is unobstructed so as to provide a even surface against a transporter's back. It is possible that a pad, mat or roll can be placed between the pet carrier bottom and a transporter's back for cushioning purposes or to tilt/elevate the carrier (see FIG. 14).

FIG. 3 shows top opening 126 of pet carrier 100 bounded by sides 124, and bottom 122 which forms a main cavity or pocket 120 which can be any depth or width to accommodate various sizes of pets. While pet retention members 150 are depicted in the preferred embodiment as straps similar to shoulder straps 140, a retention member can be for example, a flap with a slit or aperture that permits a pet to pass its head through. It should be also noted that aperture 180 bounded by straps or flap retention member is shaped and sized such that a pet may escape if needed, for example, in cases where the pet owner stumbles or falls from his or her bicycle. The pet carrier may be equipped with an attachment point (not shown) for a pet collar or leash.

Figure 17:
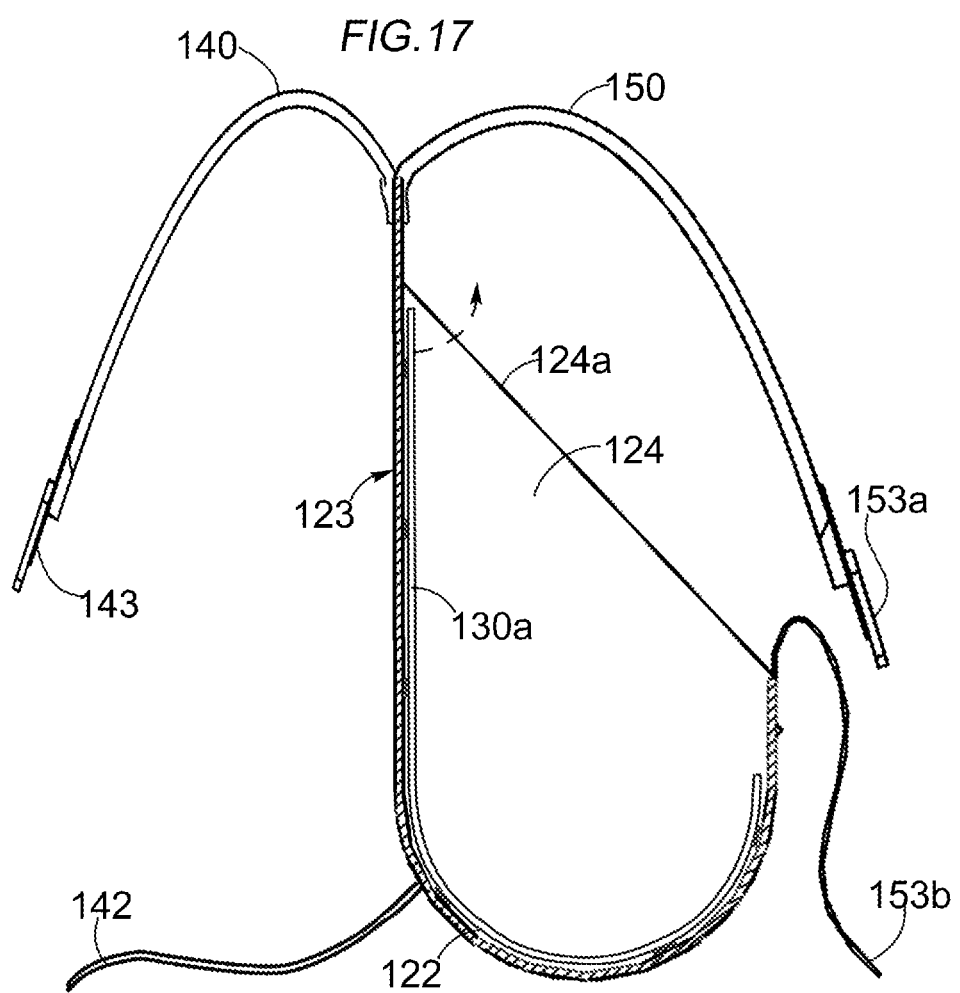
FIG. 17 is a cross-sectional view taken along lines 4-4 of (FIG. 3) showing a removable resilient panel 130*a*.

FIG. 4 is a cross-sectional view taken along lines 4'-4' of (FIG. 3) that shows panel 130 disposed between an inside bottom surface and outer surface of the pet carrier, and side 124 that adjoins the upper and lower portions of the panel. A semi-rigid plastic panel sewn between the materials covering of the pet carrier can be a ballistic nylon, polyester webbing, Kevlar or another resilient and durable material. FIG. 17 shows a cross-section of the body of the pet carrier also taken along lines 4'-4' of (FIG. 3), depicting a removable resilient panel 130a attachable to the inside bottom the pet carrier. The inside bottom of the pet carrier can be adapted to receive a removable absorbent and launderable liner which may serve as a cover for the removable resilient panel, or be a separate element.

FIGS. 4 and 5 show respectively, pet carrier 100 mounted to the back of a standing transporter, and the carrier mounted to the back of a cyclist. In either case, the curve of bottom 122 provides a floor that encourages the pet to stand or sit in a forward facing position. In this way the pet can experience the sights along with its human transporter.

FIG. 5a in a diagrammatic view, shows a carrier in a un-collapsed state suitable for carrying a pet, and in FIG. 5b, the carrier in the process of forced collapse in in the direction of the arrow, in preparation for storage. Transverse vertices of the panel may include living hinges, or the panel may be scored so that it assumes more readily a desired profile. FIGS. 5c and 5d show other panel configurations that are collapsible. FIG. 6 depicts a teardrop shaped carrier wherein upper portion of a resilient panel is divided into sections which are placed or sandwiched between the materials of the carrier.

FIG. 7 shows an embodiment having a retention member 150 in the form of a flap with an aperture or slit 180 to permit a pet's head to pass therethrough. Such a flap may be connected along any side of the carrier, and secured by fasteners such as hook and loop strips (153a, 153b), snaps or buttons at its free end.

Typically, the carrier is worn by the pet owner as shown in FIG. 11 similar to a backpack when walking or riding (see FIG. 12). FIG. 10 shows pet retention straps 150 and pet aperture 180.

Figure 13:
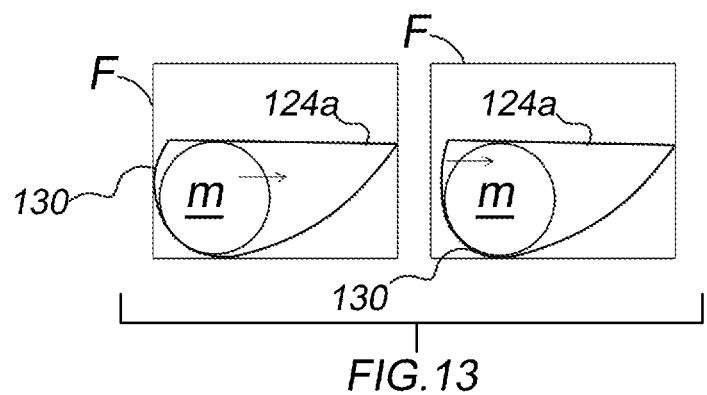
FIG. 13 diagrammatically shows mass shifting of an object (m) accompanied by a flexing of a resilient panel 130 of the preferred embodiment.

FIG. 13 shows a typical forward mass shift of a carried body (m). The position of the panel 130 curve to frame (F) changes as the mass shifts, in this case, forward and down from the first to second frames. The tendency of the bottom of the panel to follow the pet's mass by flexing up and down as the pet's body moves up and down, maintains a stable and shock absorbing platform for the pet when subjected to the acceleration and deceleration of transport.

Figure 14:
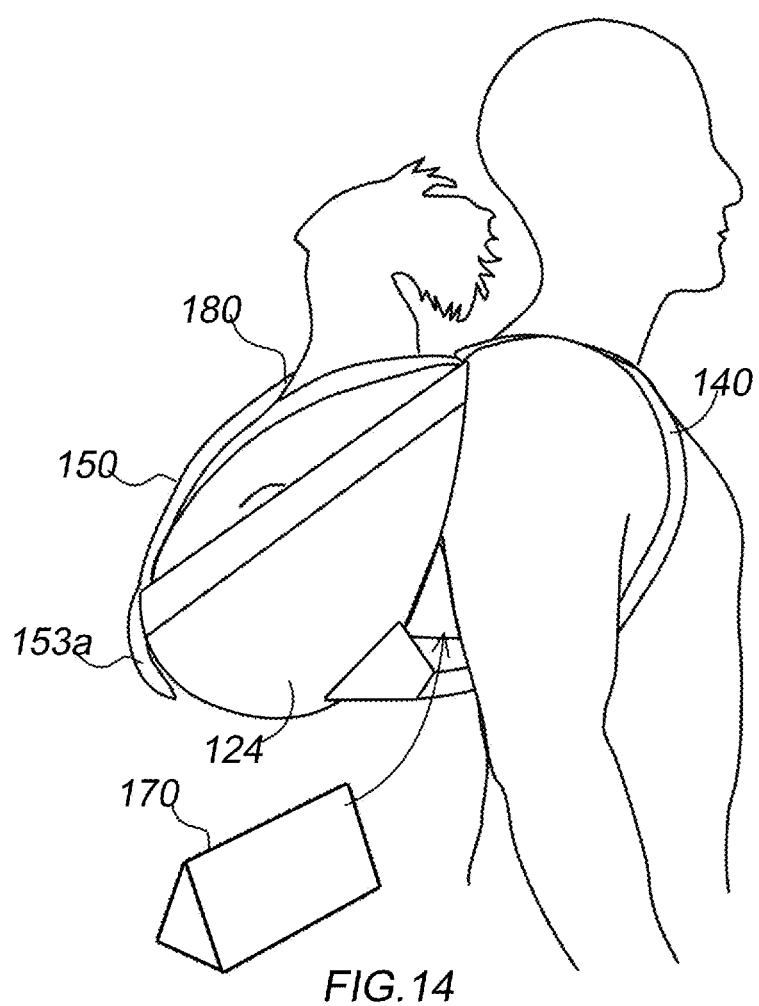
FIG. 14 depicts a wedge 170 that can be used with the present invention in order to adjust the transport angle according to user preference.

Referring to FIG. 14, an optional wedge 170 is depicted for placement between the forward facing surface of the carrier and a pet transporter's back to adjust the angle of the carrier for a particular mode of transport; e.g.; hiking, biking, boating, jogging and running among others, according to user preference and pet comfort. Preferably, the wedge is constructed of a closed cell foam, but can be produced by forming a three-sided channel of a flexible plastic. The wedge can be removably affixed to the bottom of the carrier by hook and loop fasteners, snaps, or other fastening means as would suggest itself to those having skill in the art and access to this disclosure.

Referring to FIGS. 15, 16a and 16b, the pet carrier may have expandable width pockets to accommodate a size range of pets. The carrier sides are expanded by means of zippered joins that when in a closed position retain an accordion fold of material between the zip fastener which corresponds to the borders between the sides and front of the carrier, and, which accordingly, permits the sides to expand when the zip fastener is un-coupled, therefore increasing the pocket width. While in the particular embodiment shown, the joins are reversibly sealable by a zip fastener, other suitable fasteners providing desired expansion and contraction of the pocket sides will suggest themselves to those skilled in the art, and having access to this disclosure.

Figure 19:
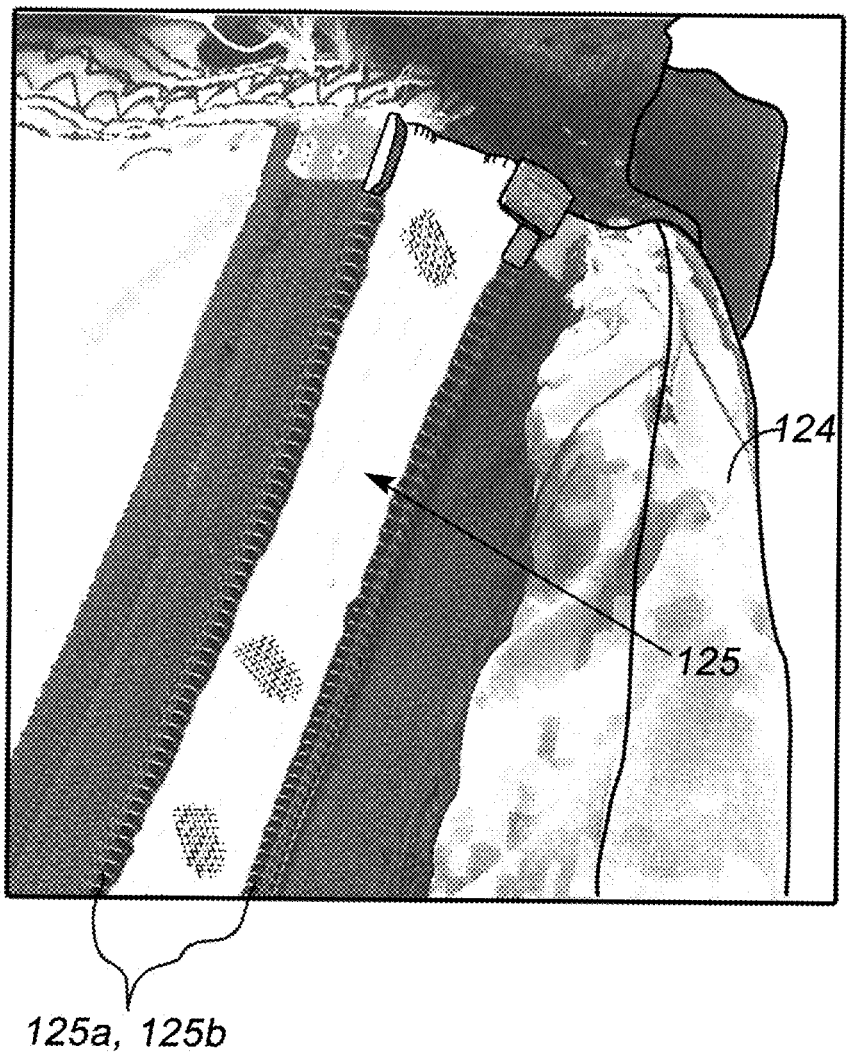
FIG. 19 is an enlarged detail view of the call out (18) in (FIG. 18) showing side expansion join 125 with teeth of the zip fastener (125*a*, 125*b*) un-coupled, the sides expanded and transverse dimensions of the carrier pocket increased.

FIGS. 18 and 19 show respectively, a perspective view of the carrier showing the borders between the left and right sides 124 and front 123, with a zip fastener defining a side expansion join 125 along the borders, and, an enlarged detail view of call out (19) in (FIG. 18) showing side expansion join 125 with teeth of the zip fastener (125a, 125b) uncoupled, the sides expanded and transverse dimensions of the carrier pocket increased. Depending on the width of the fabric or other pliant material in the expansion join between the zip fastener sides (125*a*, 125*b*), the overall width increase of the pocket when both sides are expanded is typically between 1 and 4 inches.

Construction materials of the pet carrier can be any sufficiently lightweight fabric, synthetic material or leather. While in the preferred embodiment, the straps are adjusted by buckles, other strap adjustment means suggesting themselves to persons having skill in the art and benefit of this disclosure can be employed without departing from the scope of the present invention. Shoulder straps and pet retention members may be attached the the carrier body at any suitable position and by any fastening method for adequate support and reinforcement as would be appreciated by those having skill in the art. While panel 130 is shown in the preferred embodiment as a rectangular panel that is curved by biasing caused by the surrounding material/fabric, other panel shapes such as rounded corner rectangles and ellipses are contemplated and can be used together or separately in either unitary form, conjoined, adjacent or abutting each other within the present invention. In any case, when the panel of is curved, it is the intent and design of the present invention that a substantially level foothold relative to a transverse axis be maintained for the carried pet so pet fatigue is minimized and slumping discouraged.

It should be understood that the drawings and detailed description herein are to be regarded in an illustrative rather than a restrictive manner, and are not intended to be limiting to the particular forms and examples disclosed. Exemplary features and objects of the embodiments described herein can be combined or not combined with one another. Accordingly, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A flexibly collapsible carrier for transporting a pet in a forward facing position comprising:

1) a pair of shoulder straps configured for placement over a transporter's shoulders;
　2) a carrier body having pocket with a front, a top opening, sides, and a bottom adapted to receive and contain a pet;
　3) disposed at the bottom of the pocket, at least one resilient panel with an upper and lower portion, a longitudinal and a transverse axis, wherein the resilient panel is configured to absorb shock caused by the movement of the pet's body during transport by flexing of the lower portion toward and away from the upper portion, and provide a substantially level non-slumping platform along its transverse axis on which a pet can stand when placed in the carrier; and,
　4) at least one retention member reversibly bridging the opening of the pocket for placement over the pet and forming an opening through which the pet can pass.

2. The collapsible carrier according to claim 1 further comprising a removable liner.

3. The collapsible carrier according to claim 1 wherein the resilient panel is removable.

4. The collapsible carrier according to claim 1 wherein the resilient panel is adapted to absorb shock by flexing along the longitudinal axis when the mass of the pet shifts up or down during transport.

5. The collapsible carrier according to claim 1 wherein the at least one resilient panel is constrained from assuming a planar disposition by the carrier body when installed in the carrier.

6. The collapsible carrier according to claim 1 wherein the pocket sides are expandable to enlarge the pocket dimensions.

7. The collapsible carrier according to claim 1 further comprising a padded wedge support for varying the angle at which the pet carrier is disposed when worn by a transporter.

8. The collapsible carrier according to claim 1 further comprising an attachment for a pet collar or leash.

\* \* \* \* \*